(12) United States Patent
Yokochi et al.

(10) Patent No.: US 7,973,953 B2
(45) Date of Patent: Jul. 5, 2011

(54) PRINTING APPARATUS

(75) Inventors: Atsushi Yokochi, Chiryu (JP); Satoru Kuwabara, Ogaki (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 1172 days.

(21) Appl. No.: 11/676,424

(22) Filed: Feb. 19, 2007

(65) Prior Publication Data

US 2007/0201047 A1 Aug. 30, 2007

(30) Foreign Application Priority Data

Feb. 28, 2006 (JP) ................. 2006-052673

(51) Int. Cl.
*G06K 15/00* (2006.01)
*G06K 1/00* (2006.01)
*H04N 1/40* (2006.01)
*G06K 9/00* (2006.01)

(52) U.S. Cl. ....... 358/1.14; 358/1.9; 358/3.28; 358/471; 382/100

(58) Field of Classification Search ................. 358/1.14, 358/1.9, 3.28, 471; 382/100; 399/1
See application file for complete search history.

(56) References Cited

U.S. PATENT DOCUMENTS

| | | | | |
|---|---|---|---|---|
| 5,774,758 A * | 6/1998 | Takahashi et al. | ................ | 399/1 |
| 6,538,759 B1 * | 3/2003 | Hiraishi et al. | .............. | 358/1.14 |
| 6,930,803 B1 * | 8/2005 | Suzuki | ........................... | 358/471 |
| 7,123,369 B2 * | 10/2006 | Hiramatsu et al. | ........... | 358/1.14 |
| 7,280,249 B2 * | 10/2007 | Ohta | ................ | 358/1.9 |
| 7,319,548 B2 * | 1/2008 | Ohta | ............................. | 358/1.9 |
| 2002/0054692 A1 * | 5/2002 | Suzuki et al. | ................. | 382/100 |
| 2005/0190411 A1 * | 9/2005 | Ohno | .......................... | 358/3.28 |

FOREIGN PATENT DOCUMENTS

| | | |
|---|---|---|
| JP | 5-207261 | 8/1993 |
| JP | 07-288681 A | 10/1995 |
| JP | 07-336533 A | 12/1995 |
| JP | 08-132773 A | 5/1996 |
| JP | 2001-218045 A | 8/2001 |
| JP | 2004-202737 | 7/2004 |

OTHER PUBLICATIONS

English Translation of Japanese Office Action dated Jan. 15, 2008 for Application No. 2006-052673, previously filed with the USPTO on Mar. 31, 2008.
Japanese Office Action dated Jan. 15, 2008 for Application No. 2006-052673.

* cited by examiner

*Primary Examiner* — James A Thompson
*Assistant Examiner* — Satwant K Singh
(74) *Attorney, Agent, or Firm* — Banner & Witcoff, Ltd.

(57) ABSTRACT

A printing apparatus includes a command input portion, an acquiring portion that acquires image data, a judging portion that determines if specified image data is included in the image data, a control portion and a printing portion that prints an image based on the image data onto a medium. Upon receiving the print command, a determination by the judging portion is performed, and when the judging portion determines that the specified image data is included, a first copy that includes invalidation processing on at least a section of the image is produced, and a second copy that includes invalidation processing on all of the image and the image in all subsequent copies that are printed thereafter is produced, to thereby execute printing of a number of copies that are specified by the print command and subsequently enter a state in which a next print command can be executed.

17 Claims, 9 Drawing Sheets

PRINTING APPARATUS

CROSS REFERENCE TO RELATED APPLICATION

This application claims priority from Japanese Patent Application No. 2006-052673 filed Feb. 28, 2006. The entire content of this priority application is incorporated herein by reference.

TECHNICAL FIELD

This disclosure relates to a printing apparatus.

BACKGROUND

Various kinds of technology have been proposed for printing apparatuses such as color copiers and color printers to prevent forgery of paper currency and marketable securities and the like. For example, the technology disclosed in Japanese Patent Laid-Open No. 5-207261 is configured to processing to print on a paper sheet an image that is based on image data acquired by reading an original image and concurrently therewith to make a judgment regarding whether or not specified image data for which output should be prohibited is included in the image data. Such an apparatus is capable of judging that the image data includes specified image data during printing and executes invalidation processing that blots out the image that has been already printed on the paper sheet using white toner, and stops the mechanical operations or discharging the paper sheet. Thus, the apparatus prevents malicious use of the specified image that is printed.

However, in the conventional printing apparatus as described above, sufficient consideration has not been given to the correct processing to be performed when a command is received to print multiple copies of a certain specified image. More specifically, for example, in the case of a printing apparatus that is used by a plurality of users, in a case where one user inputs an instruction to print multiple copies of a certain specified image, when the mechanical operations are stopped, other users who are not attempting to print the specified image are inconvenienced and their print job is delayed.

In view of the above circumstances, there is a need for technology that makes it possible for a printing apparatus to perform appropriate processing when an instruction is made to print multiple copies of a specified image for which output should be prohibited.

SUMMARY

According to one illustrative aspect of the present invention a printing apparatus includes a command input portion capable of inputting a print command, an acquiring portion that acquires image data after a print command is input, a judging portion that determines if specified image data is included in the image data that is acquired by the acquiring portion, a control portion and a printing portion that prints an image based on the image data onto a medium based on a signal from the control portion. Upon receiving the print command, a determination by the judging portion is performed, and when the judging portion determines that the specified image data is included, a first copy that includes invalidation processing on at least a section of the image is produced, and a second copy that includes invalidation processing on all of the image and the image in all subsequent copies that are printed thereafter is produced, to thereby execute printing of a number of copies that are specified by the print command and subsequently enter a state in which a next print command can be executed.

Also, based on another illustrative aspect of the present invention a printing apparatus includes a command input portion capable of inputting a print command, an acquiring portion that acquires image data, a judging portion that determines if specified image data is included in image data that is acquired by the acquiring portion, a printing portion that is capable of printing an image on a medium for recording, and a control portion that causes the printing portion to print an image that is based on image data that is acquired by the acquiring portion on the basis of the print command. Upon receiving a print command to perform printing of a plurality of copies, the control portion causes the printing portion to start printing concurrently with a judgment by the judging portion, and when the judging portion judges that specified image data is included, cancels a print processing that is based on the print command and subsequently enters a state in which a next print command can be executed.

BRIEF DESCRIPTION OF THE DRAWINGS

Illustrative aspects in accordance with the invention will be described in detail with reference to the following figures wherein.

DETAILED DESCRIPTION OF THE PRESENT INVENTION

Next, an illustrative aspect according to this invention will be described with reference to FIG. 1 to FIG. 6.

Figure 1:
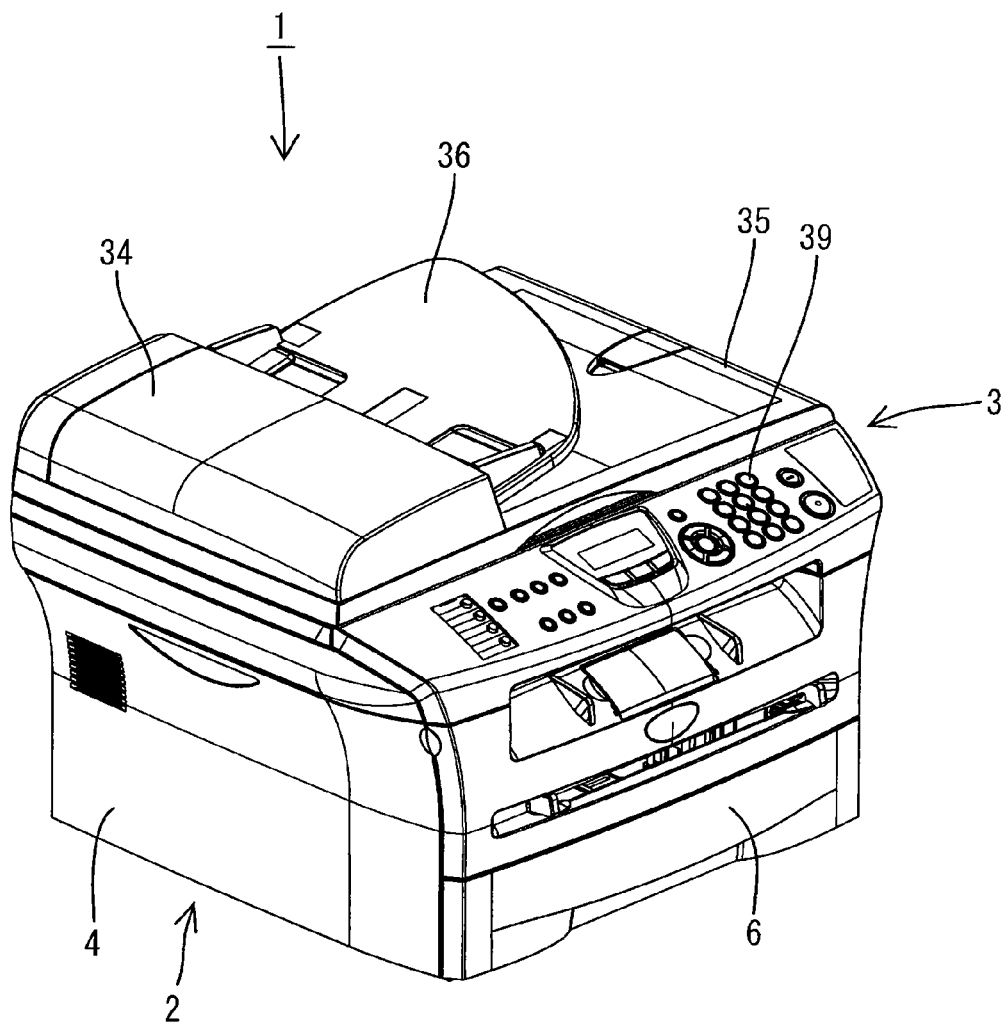
FIG. 1 is an oblique perspective view showing the outer appearance of a printing apparatus according to one illustrative aspect of the present invention.
Figure 2:
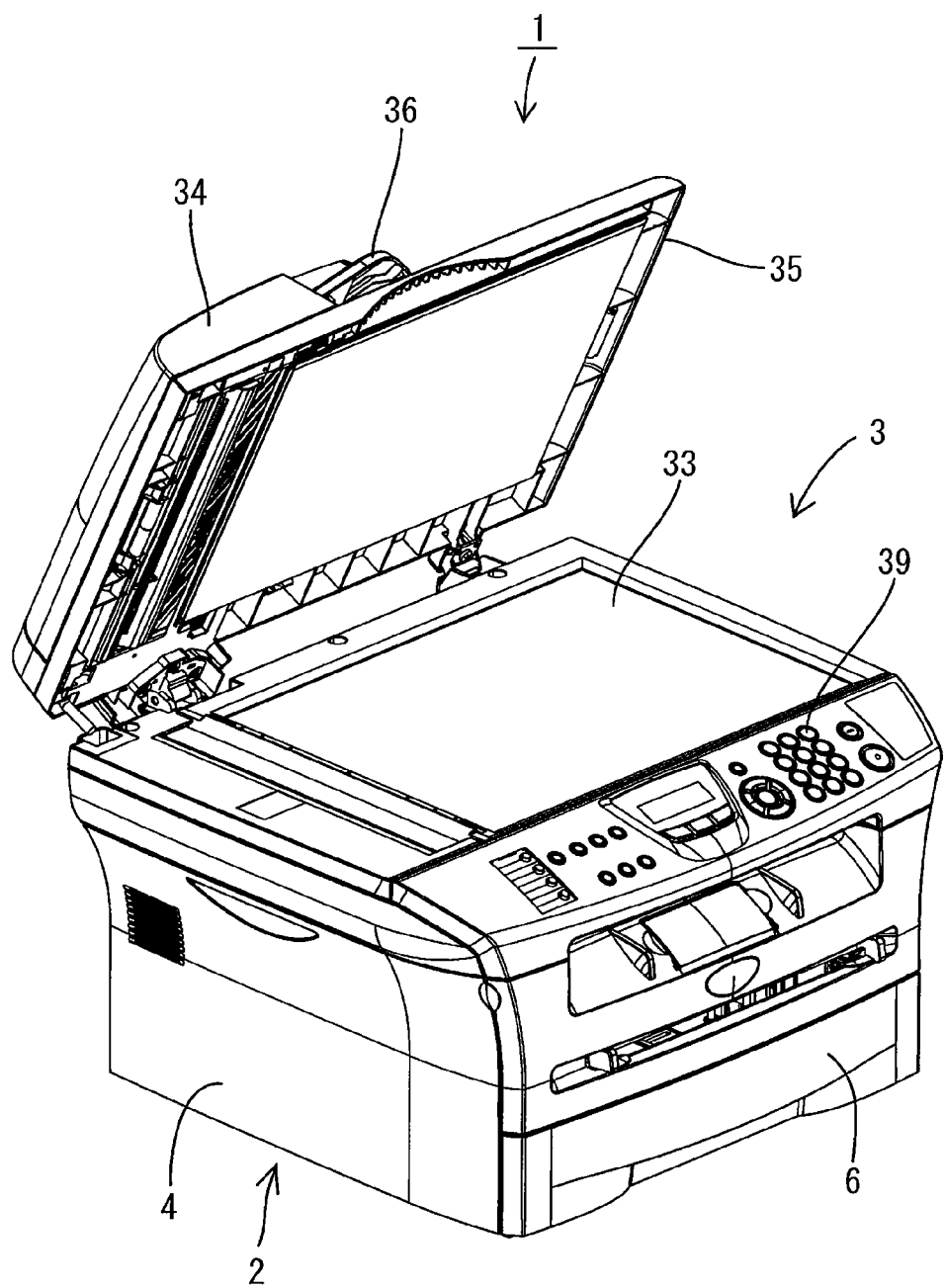
FIG. 2 is an oblique perspective view of the printing apparatus that shows a state in which an original cover is raised.

FIG. 1 is an oblique perspective view showing the outer appearance of a printing apparatus 1 according to an illustrative aspect of the present invention, and FIG. 2 is an oblique perspective view of the printing apparatus 1 that shows a state in which an original cover 35 is raised. This printing apparatus 1 is a multifunction peripheral that can be equipped with various functions such as a printer function, a scanner function and a copy function. The printing apparatus 1 can include a main body portion 2 that houses an image forming portion 10 (one example of "printing portion") that forms an image on a recording medium 5. Further, printing apparatus 1 can include an original reading portion 3 (one example of "acquiring portion") that is provided on top of the main body portion 2 and reads an original image.

Figure 3:
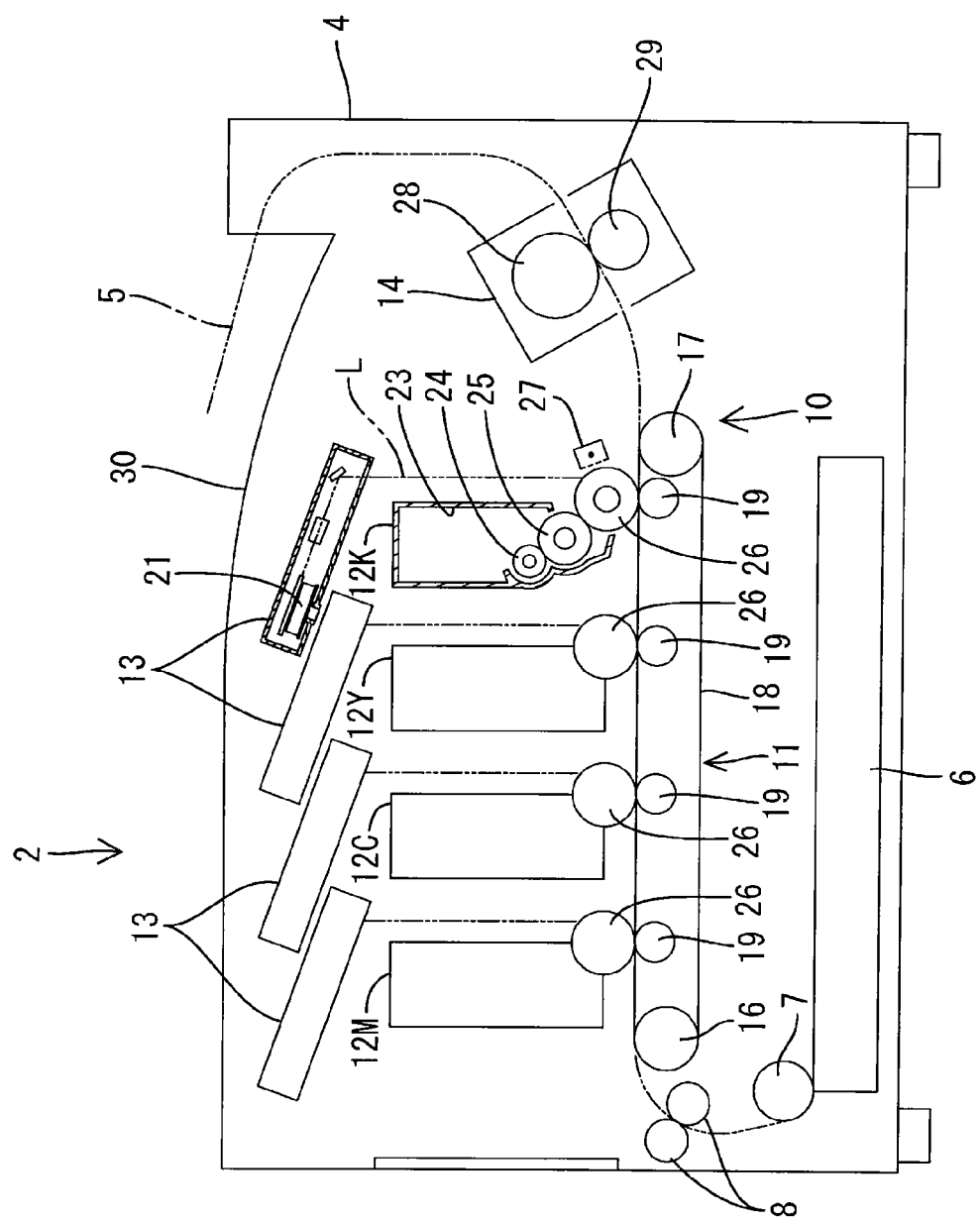
FIG. 3 is a cross section showing a schematic configuration of a main body portion.

FIG. 3 is a cross section showing a schematic configuration of the main body portion 2. In the description below, the left side in this figure is taken to be the front.

The main body portion 2 includes a substantially box-shaped main body casing 4, and a stacking portion 6 in which a plurality of recording media 5 for forming an image are stacked is provided at the inside bottom of this main body casing 4 in a condition in which the stacking portion 6 can be pulled out towards the front side. A sheet feeding roller 7 is provided at an upper region at the front end of the stacking portion 6. By rotation of this sheet feeding roller 7, a single recording medium 5 that is stacked at the uppermost position inside the stacking portion 6 is delivered to registration rollers 8 that are provided above the sheet feeding roller 7. At the registration rollers 8, the recording medium 5 is delivered (i.e. in a predetermined timing operation) onto the top of a belt unit 11 that is disposed to the rear of the registration rollers 8.

The image forming portion 10 is provided above the stacking portion 6 inside the main body casing 4. The image forming portion 10 comprises the belt unit 11, process units 12M, 12C, 12Y and 12K, exposing portions 13 and a fixing device 14.

In the belt unit 11, a conveying belt 18 is provided in a horizontally suspended condition between a pair of supporting rollers 16 and 17 at the front and rear thereof, and by rotational driving of the supporting roller 17 that is disposed at the rear side, the conveying belt 18 can move in a circulating manner such that the recording medium 5 that is placed on the top surface thereof is conveyed rearward. On the inner side of the conveying belt 18, transfer rollers 19 that are disposed facing respective photosensitive drums 26 of the process units 12, described later, are provided in a condition in which they are aligned in the front-to-rear direction.

Each of the exposing portions 13 emits a laser beam L that corresponds to one color of image data from a light source, and irradiates the laser beam L by high-speed scanning onto the surface of the respective photosensitive drum 26 via a polygon mirror or the like that is rotationally driven by a polygon motor 21.

The process units 12M, 12C, 12Y and 12K can respectively include a toner containing chamber 23 that contains toner of the color magenta (M), cyan (C), yellow (Y), black (K) or the like, a supply roller 24, a developing roller 25, a photosensitive drum 26, a charging device 27 (for example, a scorotron charging device) and the like.

Toner that is discharged from the toner containing chamber 23 is supplied to the developing roller 25 by rotation of the supply roller 24, and at that time, the area between the supply roller 24 and the developing roller 25 is triboelectrically charged positively. Accompanying that rotation, the surface of the photosensitive drum 26 is uniformly charged to a positive charge by the charging device 27, and thereafter, the surface is exposed by the laser beam L from the exposing portion 13 to thereby form an electrostatic latent image thereon that corresponds to the image to be formed on the recording medium 5. Next, when the toner that is carried on the surface of the developing roller 25 is transferred to the surface of the photosensitive drum 26 by the rotation of the developing roller 25. Thereafter, the toner image that is carried on the surface of the photosensitive drum 26 is transferred to the recording medium 5 by a transfer bias voltage applied to a transfer roller 19 while the recording medium 5 passes between the photosensitive drum 26 and the transfer roller 19.

The fixing device 14 comprises a heat roller 28 that has a heat source, and a pressure roller 29 that presses the recording medium 5 to the heat roller 28 side. The fixing device 14 subjects the toner image that is transferred onto the recording medium 5 to heat fixing to the sheet surface. The recording medium 5, on which a toner image is transferred by the fixing device 14, is then conveyed upward to be discharged onto a discharge tray 30 that is provided on the top surface of the main body casing 4.

As shown in FIG. 1 and FIG. 2, the original reading portion 3 is equipped with an original placement portion 33 comprising a transparent glass plate. An original is placed on this original placement portion 33 when reading an original by a so-called "flatbed" method. In this instance, an original can include, but is not limited to, a medium including an image. The top surface of the original placement portion 33 is covered by an original cover 35 provided with an ADF 34 in a condition in which the original cover 35 can open and close. The ADF 34 is equipped with an original tray 36 in which a plurality of originals can be stacked. The original tray 36 is provided with an original detection sensor (not shown) that can utilize a photosensor or the like for detecting whether or not an original is stacked thereon. The ADF 34 conveys, one by one, originals that are stacked on the original tray 36, and discharges each original after that original has been read by a CCD image sensor 37 that is described next.

The CCD image sensor 37 (see FIG. 4) is provided below the original placement portion 33. The CCD image sensor 37 comprises photodiodes that are disposed in a row in the front to rear direction. When a strong light is shone on an original by a light source, the light is reflected and is received by the individual photodiodes. The photodiodes then convert the light intensity (brightness) of the reflected light for each pixel of the original into an electrical signal. At the original reading portion 3, these electrical signals are converted into digital data by an A/D converter (not shown), to thereby read the image that is on the original as image data.

Reading of an original may be performed by placing the original on the original placement portion 33 or by utilizing the ADF 34. In the former case, the CCD image sensor 37 moves in a left to right direction along the plate surface of the original placement portion 33, and at that time reading of the original on the original placement portion 33 is performed one line at a time. In the latter case, the CCD image sensor 37 is fixed at a position at the left end of the original placement portion 33, and reading of the original is performed one line at a time by conveying the original (via the ADF 34) to a position at which the original can be read by the CCD image sensor 37.

A console 39 (one example of "command input portion") includes various buttons and the like is provided on the top surface of a front end part of the original reading portion 3. Using this console 39, a user can input various commands for operating the printing apparatus 1, such as a print command for executing a printing process for an original.

Figure 4:
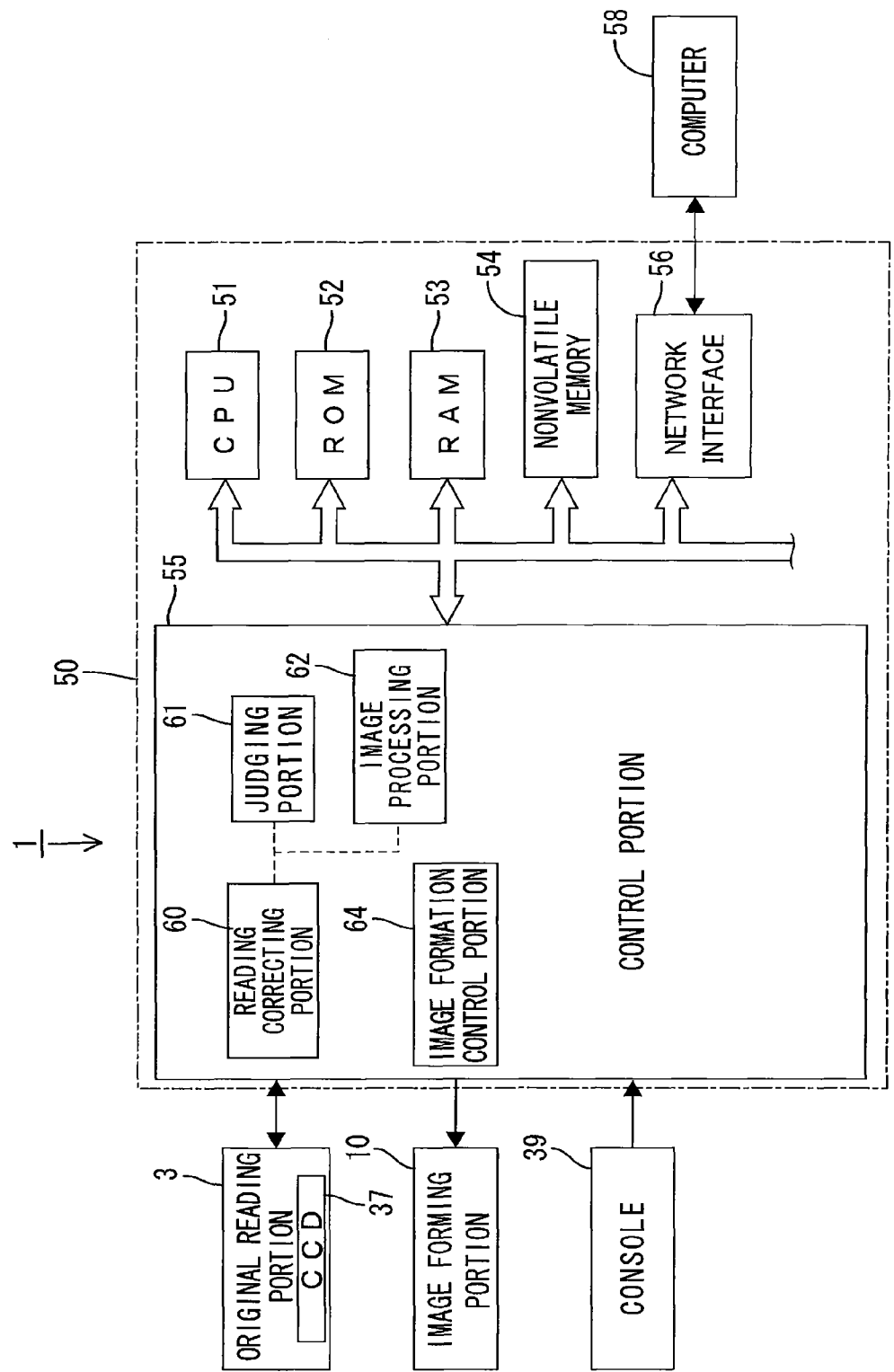
FIG. 4 is a block diagram that conceptually shows the electrical configuration of the printing apparatus.

Next, the electrical configuration of the printing apparatus 1 is described. FIG. 4 is a block diagram that conceptually shows the electrical configuration of the printing apparatus 1. The printing apparatus 1 includes a control apparatus 50 having a CPU 51 (one example of "control portion"), a ROM 52, a RAM 53, a nonvolatile memory 54, a control portion 55, a network interface 56 (one example of "command input portion", "acquiring portion" and "communication portion") and the like.

Various control programs for controlling the printing apparatus 1, various settings and initial values and the like can be stored in the ROM 52. The RAM 53 is used as a work area to which various control programs are read out, or as a storage area that temporarily stores image data. Further, as described later, information regarding whether or not the judging portion 61 determines or judges that specified image data is included in image data or the contents of an input print command and the like are temporarily stored in the RAM 53.

In accordance with control programs that are read out from the ROM 52, the CPU 51 controls each component of the printing apparatus 1 through the control portion 55 while storing the processing results in the RAM 53 or the nonvolatile memory 54.

An external computer 58 (one example of "information processing apparatus") is connected to the network interface 56 (one example of "communication portion", "command input portion" and "acquiring portion"), and mutual data communication is possible between the external computer 58 and the network interface 56. A print command or image data from the external computer 58 can be received through the network interface 56.

The control portion 55 can include an ASIC (Application Specific Integrated Circuit) and is electrically connected to each portion such as the original reading portion 3, the image forming portion 10 and the console 39 described above. The control portion 55 includes a reading correcting portion 60 that is connected to the original reading portion 3, and a judging portion 61 and an image processing portion 62 that are connected to the reading correcting portion 60. Concurrent with a reading operation by the original reading portion 3, the reading correcting portion 60 receives the image data that is acquired by the original reading portion 3 and performs correction processing, such as gamma correction, shading compensation and the like on the selected image data.

The judging portion 61 receives image data that is corrected by the reading correcting portion 60, and determines whether or not specified images (such as paper currency or marketable securities) are included in the image contents of that image data based on predetermined judging conditions. A judging condition, for example, can include the concordance rate between the image data and previously stored reference data is used. More specifically, in this case the judging portion 61 calculates the concordance rate between image data and previously stored reference data, and when that concordance rate is equal to or greater than a predetermined threshold value, the judging portion 61 determines that the image data includes specified image data. Further, when the concordance rate is less than the threshold value the judging portion 61 determines that the image data does not include specified image data.

The image processing portion 62 receives image data that was corrected by the reading correcting portion 60, and performs processing to convert that image data (RGB image data) into image data corresponding to the colors magenta, cyan, yellow and black (MCYK image data) and the like, and stores the image data after that conversion processing in the RAM 53.

The above described judging portion 61 and image processing portion 62 can also process image data received from outside through the network interface 56 (image data after expansion processing) in the same manner as image data acquired with the original reading portion 3.

The control portion 55 can also include an image formation control portion 64 that is connected to the image forming portion 10. Under the control of the CPU 51, the image formation control portion 64 reads out image data that has been converted by the image processing portion 62 and which is stored in the RAM 53, and prints out an image based on that image data on the recording medium 5 by controlling the image forming portion 10.

When the power of the printing apparatus 1 is turned on, the CPU 51 enters a standby state for a print command to be input from the console 39 or through the network interface 56, and when a first print command is input the CPU 51 executes print processing in accordance with the instruction contents of the first print command. When a second print command is received during execution of print processing for the first print command, the CPU 51 stores the instruction contents of the second print command in the RAM 53 as processing in a waiting state, and after completing processing for the first print command, the CPU 51 executes processing for the second or subsequent print command(s). When processings for a plurality of print commands are in a waiting state, the processings are executed one at a time in the order in which those print commands are entered.

Figure 5:
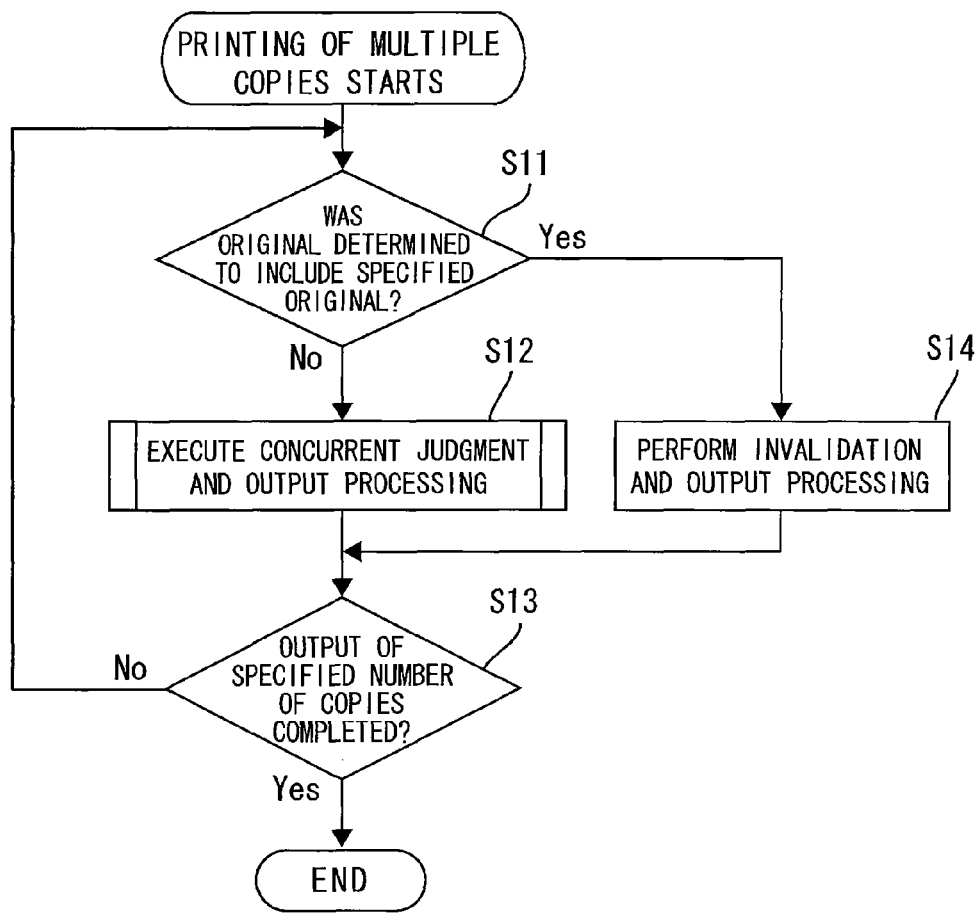
FIG. 5 is a flowchart showing the flow of printing processing according to this illustrative aspect.
Figure 6:
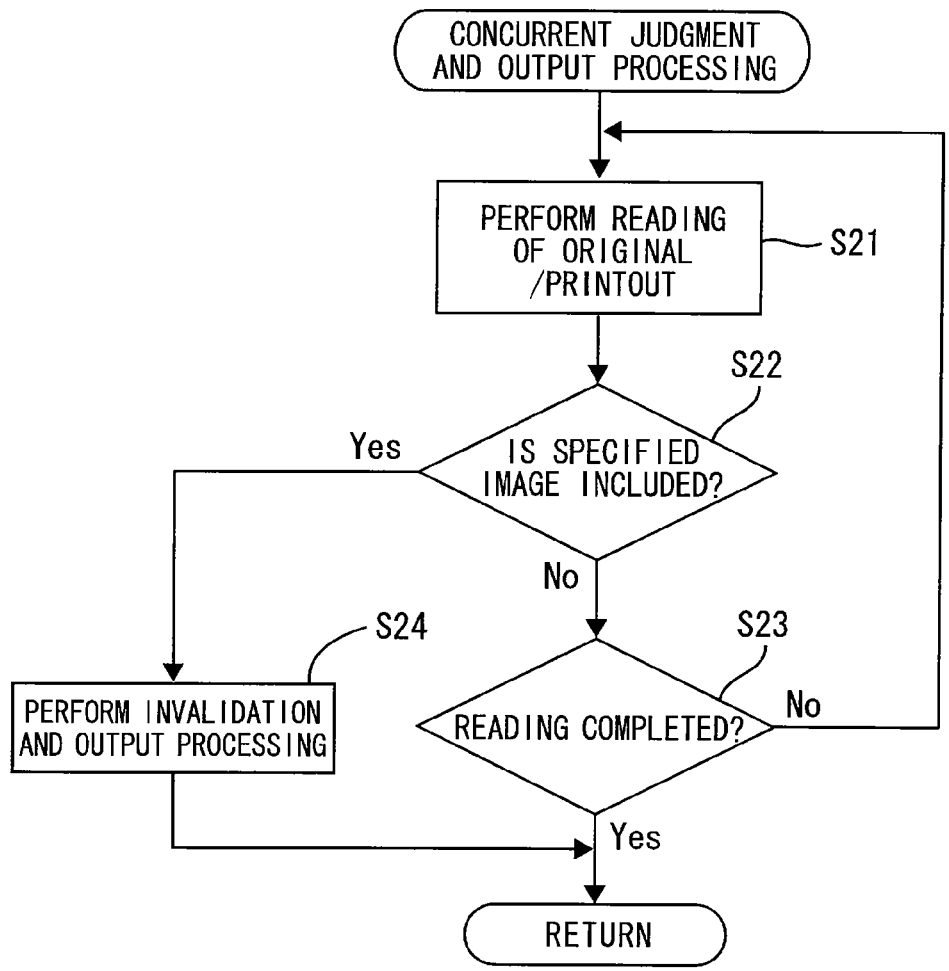
FIG. 6 is a flowchart showing the flow of concurrent judgment and output processing.

Next, the processing in a case where an image that is read from an original placed on the original placement portion 33 is printed out on a plurality of copies is described. FIG. 5 and FIG. 6 are flowcharts that illustrate the flow of control processing executed by the CPU 51.

When a print command instructing printing (copying) of a plurality of copies of an original is input from the console 39 based on a user placing an original on the original placement portion 33, the CPU 51 receives that print command and starts the print processing shown in FIG. 5. The CPU 51 first determines whether or not the judging portion 61 has determined whether specified image data included in the image data (S11). Immediately after the start of print processing, since a judgment is not made yet by the judging portion 61, the CPU 51 will always determine "No" at this step (S11: No). Next, the CPU 51 executes concurrent judgment and output processing in which a determination (as made by the judging portion 61) and printout by the image forming portion 10 are performed concurrently (S12).

In this concurrent judgment and output processing, as shown in FIG. 6, the CPU 51 first causes the original reading portion 3 to execute an operation to read the original image, and concurrent places the image formation control portion 64 in a state in which printout is enabled (S21). As described previously, in parallel with this reading operation, a determination is performed, by the judging portion 61, regarding whether or not image data (image data that underwent correction processing by the reading correcting portion 60) that is acquired by the original reading portion 3 includes specified image data. Further, in parallel therewith, conversion processing of image data (image data that underwent correction processing) is performed at the image processing portion 62, and the image data that has underwent the conversion processing is stored in sequence in the RAM 53.

When the image data after conversion processing (that is stored in the RAM 53) reaches a predetermined amount, printout by the image forming portion 10 commences. More specifically, the image data (after conversion processing) that is stored in the RAM 53 is sequentially read in by the image formation control portion 64, and an image (based on that image data) is printed on the recording medium 5 and output by the image forming portion 10. Image data (corresponding to image data on the printout) is sequentially deleted from the RAM 53.

Next, the CPU 51 determines whether or not the judging portion 61 has determined if the image data includes specified image data (S22). When it is not determined that the image data includes specified image data (S22: No), the CPU 51 determines whether or not an operation by the original reading portion 3 to read an original image is completed (S23), and when the reading operation is not completed (S23: No), the processing returns to S21 to repeat the processing from S21 to S23. When the operation to read an original image is completed (S23: Yes), the CPU 51 quits this concurrent judgment and output processing. Thereby, one copy of the recording medium 5 (on which an image based on image data acquired from an original is printed) is discharged onto a discharge tray 30.

Further, when the judging portion 61 judges that the image data includes specified image data (S22: Yes), the CPU 51 causes the image forming portion 10 to execute printout of an image that is based on image data that has underwent invalidation processing (S24). A method of performing invalidation processing with respect to image data is, for example, a method which makes the image data acquired by the original reading portion 3 abnormal by stopping the movement of the CCD image sensor 37 or turning off the light source of the CCD image sensor 37 or the like. Other methods include a method that adds some kind of alteration to the image data when performing conversion processing at the image processing portion 62, and a method that adds some kind of alteration to the image data when reading out the image data from the RAM 53 using the image formation control portion 64. In this connection, a configuration may also be adopted in which, when the judging portion 61 judges that the image data includes specified image data (S22: Yes), the reading operation of the original reading portion 3 stops.

As a result, with respect to a copy that is currently being printed, the recording medium is output in a state in which an image that is subjected to invalidation processing is printed on at least a section that was printed after the determination. This can also be referred to as an invalidation image. The term "invalidation image" may refer to, for example, an image in which a pattern or characters are superimposed on the original image or to an image that is completely different to the original image (including blotting out and the like). After this, the CPU 51 quits the concurrent judgment and output processing.

Following the concurrent judgment and output processing (S12), the CPU 51 determines whether or not output of the specified number of copies has been completed (S13), and when output has not been completed (S13: No) the operation returns to S11. When the judging portion 61 determines that the image data does not include specified image data in the concurrent judgment and output processing at S12, the processing of S11 to S13 is repeated the same number of times as the specified number of copies. When printout of the specified number of copies is completed (S13: Yes), the CPU 51 ends this print processing.

Further, when the judging portion 61 determines that the image data includes specified image data in the concurrent judgment and output processing at S12, in S11 the CPU 51 determines that the judging portion 61 has judged that the image data includes specified image data (S11: Yes). In this case, the CPU 51 causes the image forming portion 10 to execute printout of one copy of an image that is based on image data that has underwent invalidation processing (S14). Although the processing in this case is the same as the processing at the aforementioned S24, since printing is performed based on image data that has underwent invalidation processing from the time of starting printout of one copy, an image that has underwent invalidation processing is printed on the whole area of that one copy.

Subsequently, in S13, the CPU 51 determines whether output of the specified number of copies has been completed, and repeats the processing of S11, S14 and S13 until output thereof has been completed. When printout of the specified number of copies is completed (S13: Yes), the CPU 51 ends this print processing.

When the print processing ends, the CPU 51 enters a state in which it is capable of executing the next print command.

Therefore, when the next print command has been already input and is in a state in which it is waiting to be processed, the CPU 51 proceeds to execute that print command. When the next print command has not been input, the CPU 51 waits for input of a print command.

According to this illustrative aspect, since printing is started concurrently with a judgment of the image data when a print command for printing a plurality of copies is received, the user is not compelled to endure a certain waiting time, as in a case where printing starts after completion of the judgment.

Further, since an image that has underwent invalidation processing is printed over the whole area, with respect to at least copies that are printed after a judgment that the image data includes specified image data, it is possible to prevent printing of a plurality of copies of the specified image at one time, and thereby suppress malicious use of the printed specified image.

Further, when it is determined during execution of printing of a plurality of copies that the image data includes specified image data, since the device enters a state in which the next print command can be executed after executing printing of the specified number of copies, it is possible to avoid delaying the processing of another user.

It is assumed that a user who attempts to print a specified image prepares a number of sheets of specific paper (as the media for recording) equal to the number of copies to be printed, and sets the sheets in the apparatus. According to this configuration, when it is judged that the image data to be printed includes specified image data, since printing of the specified number of copies is performed to consume the same number of copies of the medium for recording, it can be expected that printing using the normal medium for recording will be possible from the next print processing.

The printing apparatus 1 executes print commands that are input from the console 39 and print commands that are input from the external computer 58 through the network interface 56 in the order of input. Thus, in a case where, for example, another user attempts to execute printing of a normal image from the external computer 58 when one user is attempting to print a specified image using the original reading portion 3, a delay in the print processing of the other user is prevented.

Further, when the printing apparatus 1 performs printing of a plurality of copies, since an operation to read the original image is performed by the original reading portion 3 for printing of each copy, a storage portion necessary for storing image data requires only a small capacity. In the printing apparatus 1 as described above, when it is determined that specified image data is included in image data during printing of a plurality of copies, a reading operation by the original reading portion 3 is stopped. It is thus possible to avoid wasteful operations, and the next processing can also be expected to start early.

Next, another illustrative aspect of this invention will be described with reference to the flowchart of FIG. 7.

According to this illustrative aspect, processing in a case where an image that is read from an original placed on the original placement portion 33 or on the original tray 36 is printed out on a plurality of copies is described. The configuration of the printing apparatus 1 is the same as in the above described illustrative aspect (the same also applies for the illustrative aspects described below).

Figure 7:
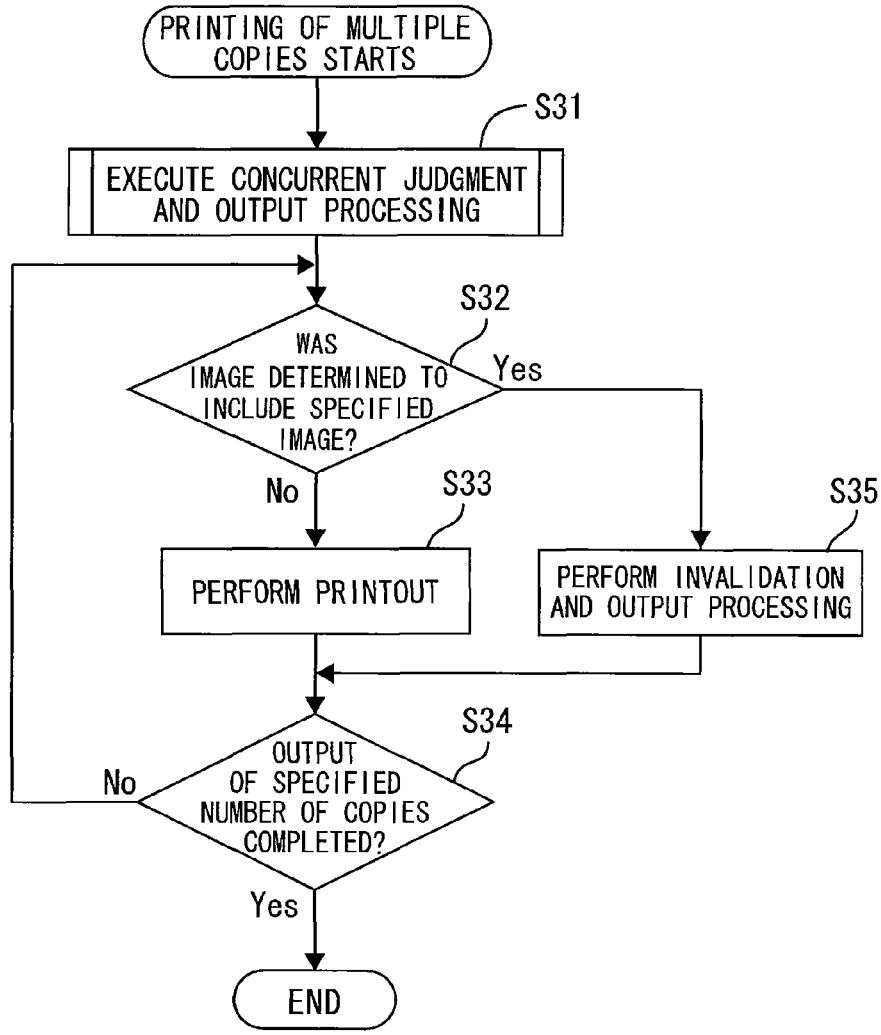
FIG. 7 is a flowchart showing the flow of printing processing according to another illustrative aspect of this invention.

When a user places an original on the original placement portion 33 or on the original tray 36 and inputs a print command instructing printing (copying) of a plurality of copies from the console 39, the CPU 51 receives that print command and starts the print processing shown in FIG. 7. The CPU 51 first executes concurrent judgment and output processing (see FIG. 6) (S31). Thereby, a reading operation and judgment processing are performed with respect to the original, and in parallel therewith the first copy is printed out. At this time, the image data acquired by the original reading portion 3 (image data after conversion processing by the image processing portion 62) is not deleted from the RAM 53, and all the image data for one original is stored on the RAM 53.

Next, the CPU 51 determines whether or not the judging portion 61 has judged that specified image data is included in the image data (S32). When it is not determined in the concurrent judgment and output processing (S31) that specified image data is included in the image data (S32: No), an image based on the image data for one original that is stored in the RAM 53 is printed out on one sheet of the recording medium 5 by the image forming portion 10 (S33). The CPU 51 then determines whether or not output of the specified number of copies has been completed (S34), and when output has not been completed (S34: No) the operation returns to S32, the processing of S32 to S34 is performed a number of times that is one less than the specified number of copies. When printout of the specified number of copies is completed (S34: Yes), the CPU 51 ends this print processing.

Further, when it is determined in the concurrent judgment and output processing at S31 that specified image data is included in the image data (S32: Yes), the CPU 51 causes the image forming portion 10 to execute printout of one copy of an image that is based on image data that has underwent invalidation processing (S35). Subsequently, in S34, the CPU 51 determines whether output of the specified number of copies has been completed, and repeats the processing of S32, S35 and S34 until output thereof has been completed. When printout of the specified number of copies is completed (S34: Yes), the CPU 51 ends this print processing. When the print processing ends, the CPU 51 enters a state in which it is capable of executing the next print command.

According to the above described processing, when it is determined in the concurrent judgment and output processing at S31 that specified image data is included in the image data (S32: Yes), with respect to a copy that is being printed at the time of judgment, an image that is subjected to invalidation processing is printed on at least a section that is printed after the judgment. Also, for copies printed thereafter, an image that is subjected to invalidation processing is printed over the whole surface (entire printing surface).

Next, a further illustrative aspect of this invention will be described with reference to the flowchart shown in FIG. 8.

In this illustrative aspect, in place of the invalidation and output processing of the illustrative aspect shown in FIG. 5 (S14), processing to discharge one sheet of the recording medium 5 is performed (S44), and the processing thereafter (S41 to S43) is performed in the same manner as the processing of FIG. 5 (S11 to S13).

According to this illustrative aspect, when it is judged in the concurrent judgment and output processing (see FIG. 6) at S42 that specified image data is included in the image data, similar to the illustrative aspect illustrated in FIG. 5, the CPU 51 causes the first copy that has been printed (at the time of judgment) to be output in a state in which an image that has underwent invalidation process is printed on at least a section of that which is printed after the judgment.

Subsequently, the operation proceeds with "No" at S43 and "Yes" at S41 to perform processing that discharges one sheet of the recording medium 5 at S44. More specifically, in this case the CPU 51 cancels processing that prints the image data and also takes out and conveys one sheet of the recording medium 5 from the stacking portion 6 by driving the sheet feeding roller 7, conveying belt 18 and the like. Further, recording medium 5 is discharged onto the discharge tray 30 so that printing of an image has not been performed and the sheet is still blank. Thereafter, the CPU 51 determines whether or not output (discharge) of the specified number of copies has been completed (S43), and when output has not been completed (S43: No) the operation returns to S41 to repeat the processing of S41, S44 and S43. When output of the specified number of copies is completed (S43: Yes), the CPU 51 ends this print processing and enters a state in which it can execute the next print command.

According to this illustrative aspect, in addition to achieving the same effect as the illustrative aspect illustrated in FIGS. 5 and 6, the consumption of coloring material (such as toner) can be suppressed.

Next, another illustrative aspect of this invention will be described with reference to the flowchart shown in FIG. 9.

According to this illustrative aspect, in place of the invalidation and output processing of the illustrative aspect shown in FIG. 7 (S35), processing to discharge one sheet of the recording medium 5 is performed (S55), and the processing thereafter (S51 to S54) is performed in the same manner as the processing of the illustrative aspect illustrated in FIG. 7 (S31 to S34).

In this illustrative aspect, when it is determined in the concurrent judgment and output processing (S51) that specified image data is included in the image data, the CPU 51 causes the first copy that is being printed at the time of the judgment to be output in a state in which an image that has underwent invalidation process is printed on at least a section that is printed after the judgment.

Subsequently, the operation proceeds with "Yes" at S52, and at S55 the print processing is cancelled and processing is performed that discharges one sheet of the recording medium 5. Thereafter, the CPU 51 determines whether or not output (discharge) of the specified number of copies has been completed (S55), and when output has not been completed (S54: No) the operation returns to S52 to repeat the processing of S52, S55 and S54. When output of the specified number of copies is completed (S54: Yes), the CPU 51 ends this print processing and enters a state in which it can execute the next print command.

According to this illustrative aspect, in addition to achieving the same effect as the illustrative aspect illustrated in FIGS. 5 and 6, the consumption of coloring material (such as toner) can be suppressed.

Although each of the foregoing illustrative aspects described a case in which image data acquired by reading an original image with the original reading portion 3 is printed out on the recording medium 5, the present invention can also be applied to a case in which image data that is sent from an external information processing apparatus is acquired through the network interface 56 and printed out on the recording medium 5. In this case, a configuration may be adopted in which, for example, determination by the judging portion 61 or conversion processing by the image processing portion 62 and printout by the image forming portion 10 are executed concurrently with reception of image data from outside.

As described above, the foregoing illustrative aspects is configured such that when it is determined that the image data included specified image data during printout of the first copy, an image that has underwent invalidation processing is printed on a section that is printed after the judgment. Yet, according to this invention a configuration may also be adopted in which, for example, the copy being printed is conveyed in the reverse direction and the image that has been already printed on the sheet is then blotted out or a predetermined pattern or characters or the like are printed over that image.

Although according to each of the foregoing illustrative aspects, a laser printer that adopts a so-called direct-transfer type tandem system is exemplified as a printing apparatus, the present invention is not limited thereto and can also be applied to a laser printer that adopts a different system such as an intermediate transfer tandem system or a four-cycle system, and can also be applied to an inkjet printer or the like.

Figure 8:
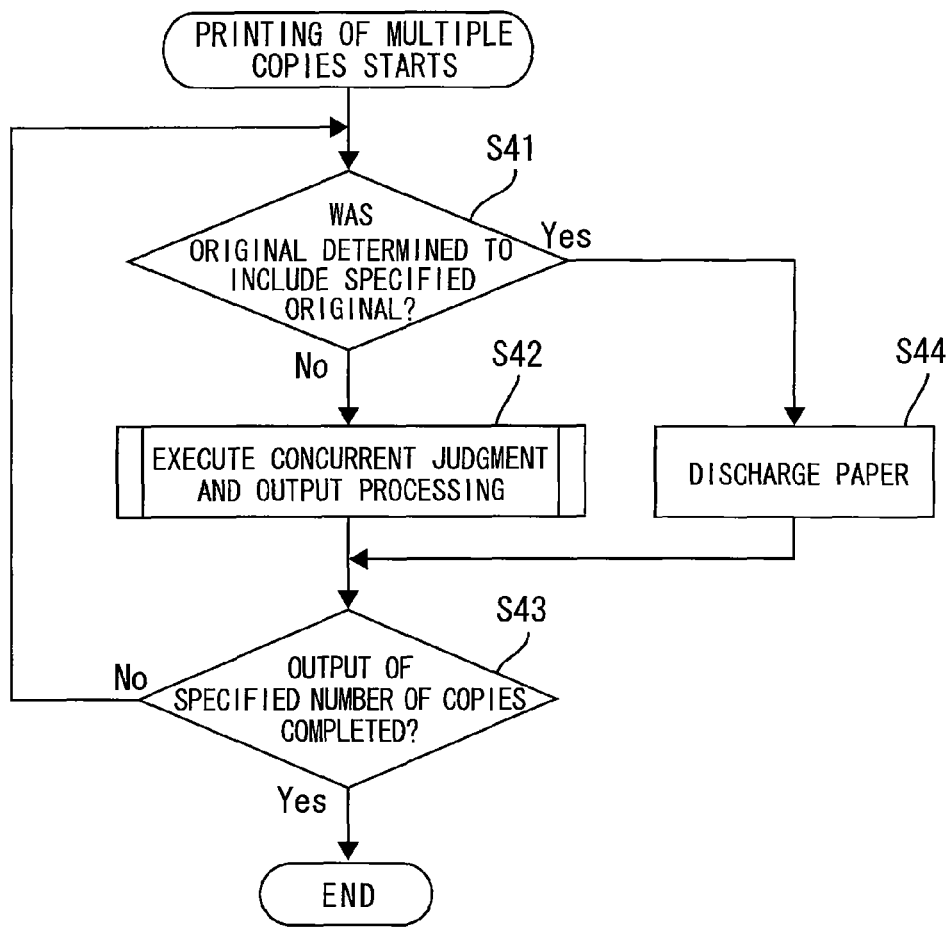
FIG. 8 is a flowchart showing the flow of printing processing according to a further illustrative aspect of this invention.
Figure 9:
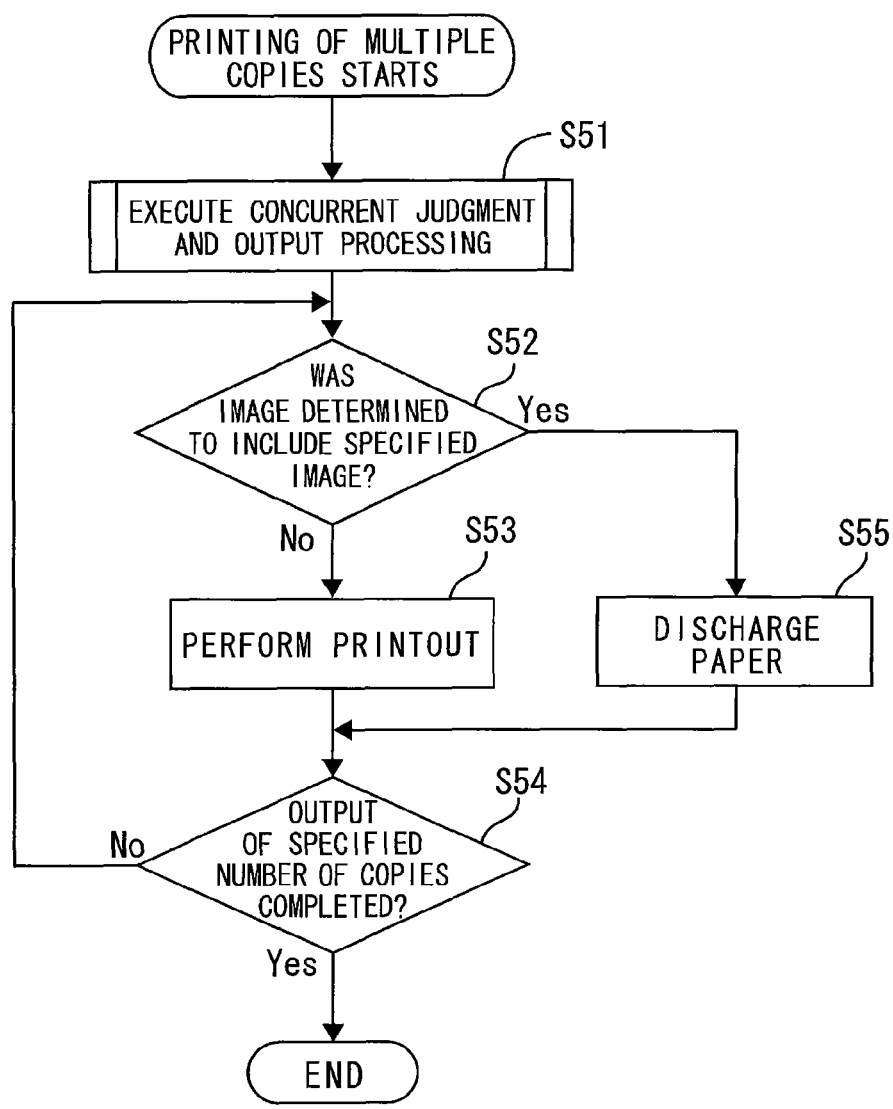
FIG. 9 is a flowchart showing the flow of printing processing according to a further illustrative aspect of this invention.

When performing printing of a plurality of copies, the print processing may be divided between print processing in which an operation to read an original is performed for printing of each copy, as in the illustrative aspects illustrated in FIG. 5 and FIG. 8, and print processing in which an operation to read an original is performed only once, as in the illustrative aspects illustrated in FIG. 7 and FIG. 9, in accordance with the instruction contents of a print command and the like. More specifically, for example, when performing printout in a high image quality mode that employs a high resolution (data amount of image data is large), a configuration may be adopted that executes the former print processing which requires usage of only a small amount of a storage portion, and when performing printout in a low image quality mode that employs a low resolution, executes the latter print processing. Alternatively, a configuration may be adopted that, when reading an original on the original placement portion, executes the former print processing since the original can be read a plurality of times, and when performing reading using the ADF 34 in which the original cannot be read a plurality of times, executes the latter print processing that requires only one reading operation.

Although according to the above described illustrative aspects a RAM is used as a data storage portion that stores image data, an image memory which is capable of storing image data may be separately provided.

A configuration may also be adopted in which image data is compressed and stored when storing the image data in a storage portion such as a RAM, and the image data is decompressed when reading out the image data.

Although according to the illustrative aspects illustrated in FIG. 8 and FIG. 9 a configuration is employed in which the print processing is cancelled and the paper is discharged when it is judged that an image includes a specified image, the configuration may be one in which only the print processing is cancelled without discharging the paper.

What is claimed is:

1. A printing apparatus, comprising:
a command input portion through which a print command is input;
an acquiring portion that acquires image data after a print command is input;
a judging portion that determines if specified image data is included in the image data that is acquired by the acquiring portion;
a control portion;
a printing portion that prints an image based on the image data onto a medium based on a signal from the control portion; and
wherein, upon receiving the print command, the control portion causes the printing portion to start printing concurrently with a determination by the judging portion, and when the judging portion determines that the specified image data is included, causes printing of the image to make a first copy that includes invalidation processing on at least a section of the image, and causes printing of the image to make a second copy that includes invalidation processing on all of the image and the image in all subsequent copies that are printed thereafter, to thereby execute printing of a number of copies that are specified by the print command and subsequently enter a state in which a next print command can be executed.

2. A printing apparatus, comprising:
a command input portion capable of inputting a print command;
an acquiring portion that acquires image data;
a judging portion that determines if specified image data is included in image data that is acquired by the acquiring portion;
a printing portion that is capable of printing an image on a medium for recording; and
a control portion that causes the printing portion to print an image that is based on image data that is acquired by the acquiring portion on the basis of the print command; and
a stacking portion that can stack a plurality of sheets of a medium for recording,
wherein, upon receiving a print command to perform printing of a plurality of copies, the control portion causes the printing portion to start printing concurrently with a judgment by the judging portion, and when the judging portion judges that specified image data is included, cancels a print processing that is based on the print command and subsequently enters a state in which a next print command can be executed, and
wherein, if the judging portion judges that specified image data is included when the printing portion executing printing, a number of sheets of the medium for recording that is specified by the print command is drawn from the stacking portion and discharged.

3. The printing apparatus according to claim 1, further comprising a communication portion that receives a print command and image data from a connected information processing apparatus, wherein,
the command input portion comprises a console that enables the input of the print command, and the communication portion;
the acquiring portion comprises an original reading portion that acquires image data by reading an original image, and the communication portion; and
the control portion executes the print command that is input from the console and the print command that are input from the communication portion in the order of input.

4. The printing apparatus according to claim 2, further comprising a communication portion that receives a print command and image data from a connected information processing apparatus, wherein,
the command input portion comprises a console that enables the input of the print command, and the communication portion;
the acquiring portion comprises an original reading portion that acquires image data by reading an original image, and the communication portion; and
the control portion executes the print command that is input from the console and the print command that are input from the communication portion in the order of input.

5. The printing apparatus according to claim 2, further comprising a communication portion that receives a print command and image data from a connected information processing apparatus, wherein,
the command input portion comprises a console that enables the input of the print command, and the communication portion;

the acquiring portion comprises an original reading portion that acquires image data by reading an original image, and the communication portion; and the control portion executes the print command that is input from the console and the print command that are input from the communication portion in the order of input.

6. The printing apparatus according to claim 1, wherein, the acquiring portion comprises an original reading portion that acquires the image data by reading an original image; further wherein the original reading portion acquires the image data for printing of each copy upon receiving a print command to perform printing of a plurality of copies and when the judging portion judges that specified image data is included, stops a reading operation by the original reading portion.

7. The printing apparatus according to claim 2, wherein, the acquiring portion comprises an original reading portion that acquires the image data by reading an original image; further wherein the original reading portion acquires the image data for printing of each copy upon receiving a print command to perform printing of a plurality of copies and when the judging portion judges that specified image data is included, stops a reading operation by the original reading portion.

8. The printing apparatus according to claim 2, wherein, the acquiring portion comprises an original reading portion that acquires the image data by reading an original image; further wherein the original reading portion acquires the image data for printing of each copy upon receiving a print command to perform printing of a plurality of copies and when the judging portion judges that specified image data is included, stops a reading operation by the original reading portion.

9. A printing apparatus, comprising:

a command input portion capable of inputting a print command;

an acquiring portion that acquires image data after a print command is input;

a judging portion that determines if specified image data is included in the image data that is acquired by the acquiring portion;

a control portion;

a printing portion that prints an image based on the image data onto a medium based on a signal from the control portion; and wherein, upon receiving the print command a determination by the judging portion is performed, and when the judging portion determines that the specified image data is included, a first copy that includes invalidation processing on at least a section of the image is produced, further wherein a second copy that includes invalidation processing on all of the image and the image in all subsequent copies that are printed thereafter is produced, to thereby execute printing of a number of copies that are specified by the print command and subsequently enter a state in which a next print command can be executed.

10. The printing apparatus according to claim 9, wherein invalidation processing includes at least one of a pattern and a character.

11. The printing apparatus according to claim 10, wherein the invalidation processing is superimposed over the image.

12. The printing apparatus according to claim 10, wherein the invalidation processing is the image printed.

13. The printing apparatus according to claim 9, further comprising a communication portion that receives a print command and image data from a connected information processing apparatus.

14. The printing apparatus according to claim 13, wherein the command input portion is positioned on a console that enables the input of the print command.

15. The printing apparatus according to claim 14, wherein the acquiring portion includes an original reading portion that acquires image data by reading an original image.

16. The printing apparatus according to claim 15, wherein the control portion executes the print command that is input from the console and the print command that is input from the communication portion in the order of input.

17. The printing apparatus according to claim 9, wherein the acquiring portion includes an original reading portion that acquires the image data by reading an original image, further wherein the original reading portion acquires the image data for printing of each copy upon receiving a print command to perform printing of a plurality of copies and when the judging portion judges that specified image data is included, stops a reading operation by the original reading portion.

* * * * *